(12) United States Patent
Cho

(10) Patent No.: US 8,318,009 B2
(45) Date of Patent: Nov. 27, 2012

(54) APPARATUS FOR MANUFACTURING OXYGENATED WATER

(75) Inventor: Jeong Gae Cho, Busan (KR)

(73) Assignee: Negatron Co., Ltd, Busan (KR)

( * ) Notice: Subject to any disclaimer, the term of this patent is extended or adjusted under 35 U.S.C. 154(b) by 73 days.

(21) Appl. No.: 12/527,914

(22) PCT Filed: Jul. 4, 2007

(86) PCT No.: PCT/KR2007/003245
§ 371 (c)(1),
(2), (4) Date: Aug. 20, 2009

(87) PCT Pub. No.: WO2008/102934
PCT Pub. Date: Aug. 28, 2008

(65) Prior Publication Data
US 2010/0126916 A1    May 27, 2010

(30) Foreign Application Priority Data
Feb. 23, 2007 (KR) .......................... 10-2007-0018297

(51) Int. Cl.
*C02F 1/48* (2006.01)
*C02F 1/72* (2006.01)
(52) U.S. Cl. ........................ 210/150; 210/222; 261/77
(58) Field of Classification Search ............... 210/150, 210/222; 261/77
See application file for complete search history.

(56) References Cited

U.S. PATENT DOCUMENTS

| 4,879,045 A | 11/1989 | Eggerichs |
| 5,925,292 A * | 7/1999 | Ziesenis ........................ 210/222 |
| 6,752,923 B1 | 6/2004 | Jans |

OTHER PUBLICATIONS

International Search Report for PCT/KR2007/003245 dated Oct. 16, 2007.

* cited by examiner

*Primary Examiner* — David A Reifsnyder
(74) *Attorney, Agent, or Firm* — Turocy & Watson, LLP

(57) ABSTRACT

An apparatus for generating oxygenated water by dissolving oxygen in water is disclosed. The apparatus includes a reservoir (10) storing drinking water, an oxygen generating unit (20) generating oxygen through electrolysis and supplying the oxygen into a pipe line (11) through which the drinking water flows, and a dissolving unit (30) dissolving the oxygen in the drinking water. The dissolving unit (30) includes a pump (31), a Venturi (32), and a dissolving container (50) and a Venturi (33) which are connected in series to each other. The dissolving container (50) is provided with an oxygen pipe (56) installed at an inlet portion thereof to supply the oxygen generated from the oxygen generating unit (20) into a center portion of the drinking water quickly supplied. Consequently, the apparatus changes physical properties and molecular structure of the drinking water to generate the micro-bubbles in the drinking water, thereby achieving the dissolved oxygen concentration of more than 150 ppm, which is beneficial to a human body. Also, since the apparatus is downsized, the use efficiency thereof is increased.

6 Claims, 2 Drawing Sheets

APPARATUS FOR MANUFACTURING OXYGENATED WATER

TECHNICAL FIELD

The present invention relates to an apparatus for generating oxygenated water by dissolving oxygen in normal water. More particularly, the present invention relates to an apparatus for generating oxygenated water by dissolving a lot of micro-unit oxygen in water to maximize dissolved oxygen concentration and also change physical properties of water, which is beneficial to a human body.

BACKGROUND ART

In general, oxygen is indispensable to life including human being.

Due to severe environmental pollution caused by accelerated industrialization, oxygen concentration in air is gradually decreasing, so that human being is threatened with various diseases.

People absorb the oxygen in the body through breathing, but can absorb the oxygen through drinking water. If people drink oxygen enriched water, a level of oxygen in the blood is increased to speed up metabolism of a human body.

Several water purifiers generating oxygenated water of high dissolved oxygen concentration have been developed recently.

The existing water purifiers generating the oxygenated water should include various mixing units and pressurizing units so as to dissolve a lot of oxygen in water. Consequently, a volume of the water purifier is increased, and thus, maximization of dissolved oxygen concentration is limited.

In addition, the water purifiers generating the oxygenated water are emphasized on only function of dissolving a lot of oxygen in the water to generate the oxygenated water dissolved with oxygen, and overlook the aspect of being beneficial to the human body.

DISCLOSURE OF INVENTION

Technical Problem

Therefore, an object of the present invention is to solve the problems involved in the prior art, and to provide an apparatus for generating oxygenated water by changing physical properties of water and simultaneously generating micro-bubbles in the water so as to maximize dissolved oxygen concentration to 150 ppm or more, which is beneficial to a human body.

Another object of the present invention is to provide an apparatus having a compact structure which can be effectively applied, installed and utilized in a wide area.

Technical Solution

In order to accomplish the above-mentioned objects, the present invention provides an apparatus for generating oxygenated water, comprising a reservoir storing drinking water, an oxygen generating unit generating oxygen through electrolysis and supplying the oxygen into a pipe line through which the drinking water flows, and a dissolving unit dissolving the oxygen in the drinking water.

The dissolving unit includes a pump, a Venturi, and a dissolving container and

Venturi which are connected in series to each other.

The dissolving container is provided at an inlet portion thereof with an oxygen pipe supplying the oxygen generated from the oxygen generating unit into a center portion of the drinking water quickly supplied.

The dissolving container is provided with at an outlet portion thereof with a physical-property changing part made of magnetic substance installed at an outlet port thereof for changing physical properties and molecular structure of the drinking water to supply micro-bubbles and increase dissolved oxygen concentration by 150 ppm or more.

The physical-property changing part is composed of a tourmaline member, a neodium member, a cerium member, and a samarium member, which are arranged side by side.

Advantageous Effects

As mentioned above, the apparatus generates oxygenated water by dissolving the circulating drinking water and the oxygen fed from the oxygen generating unit and changing the physical properties of the drinking water using the physical-property changing part to generate the micro-bubbles in the drinking water, thereby achieving the dissolved oxygen concentration of more than 150 ppm, which is beneficial to a human body. Also, since the apparatus is downsized, the use efficiency thereof is increased.

BRIEF DESCRIPTION OF THE DRAWINGS

The above objects, other features and advantages of the present invention will become more apparent by describing the preferred embodiments thereof with reference to the accompanying drawings, in which.

BEST MODE FOR CARRYING OUT THE INVENTION

Hereinafter, preferred embodiments of the present invention will now be described in detail with reference to the accompanying drawings.

Figure 1:
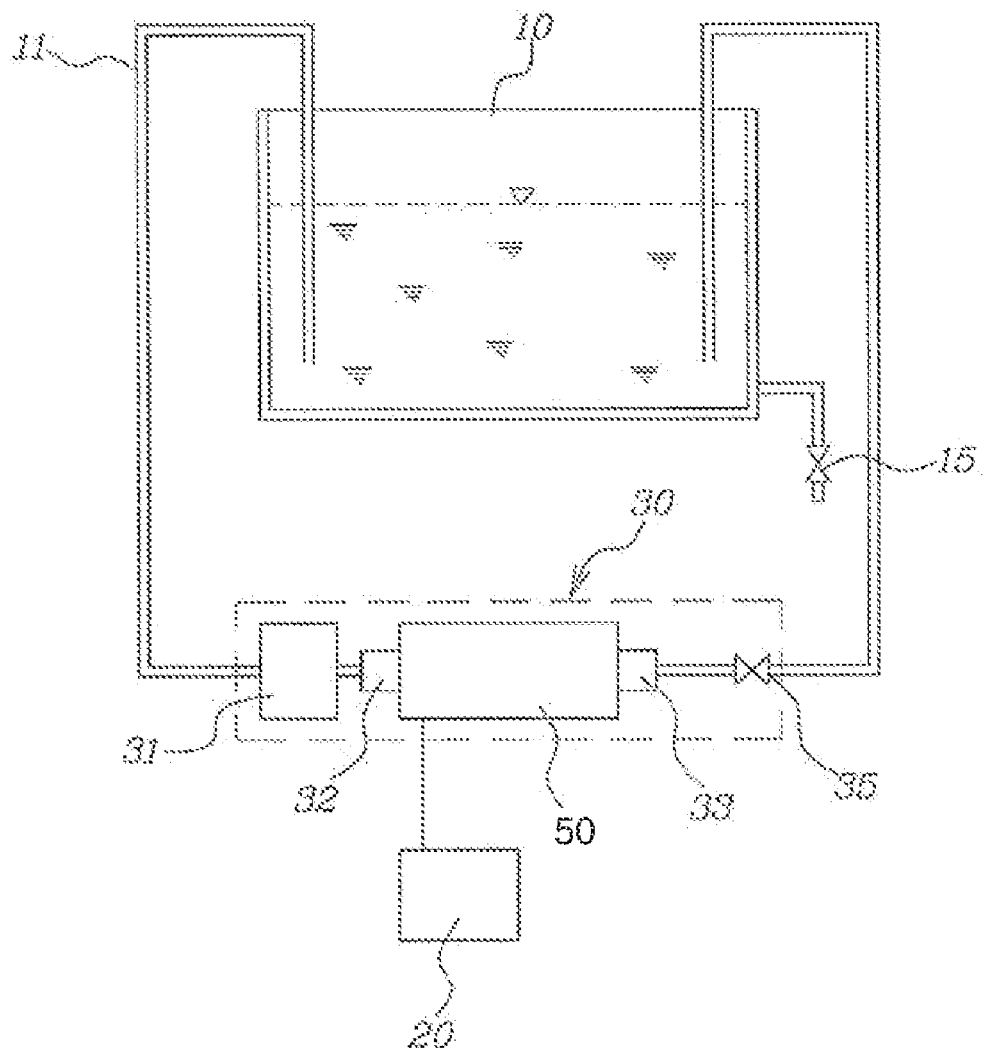
FIG. 1 is a view schematically illustrating the construction of an apparatus according to an embodiment of the present invention.
Figure 2:
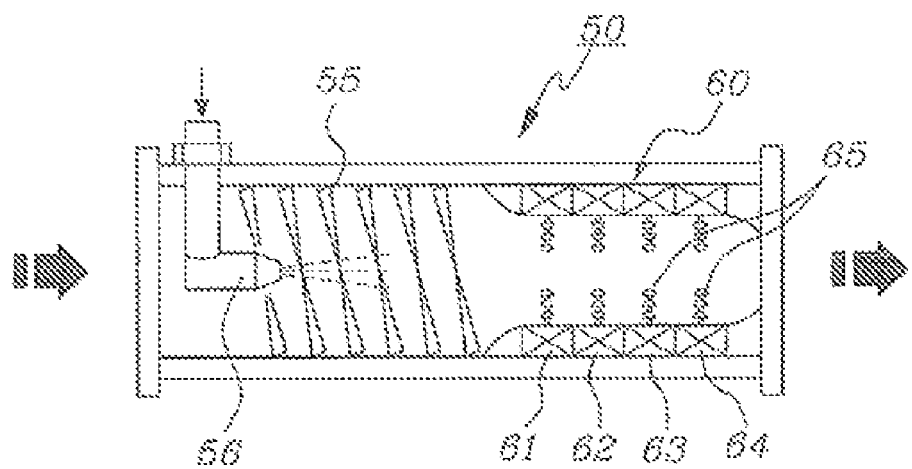
FIG. 2 is a view illustrating a dissolving unit of the present invention.
Figure 3:
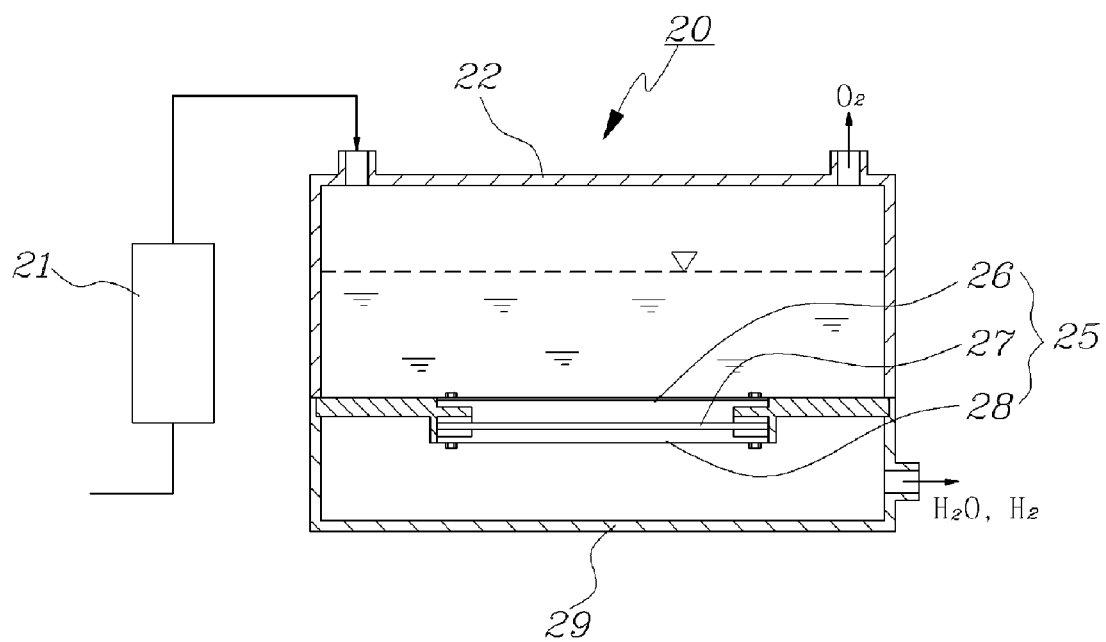
FIG. 3 is a view illustrating an oxygen generating unit of the present invention.

FIGS. 1 to 3 show an apparatus for generating oxygenated water according to the present invention.

The apparatus includes a reservoir 10 for storing drinking water, an oxygen generating unit 20 for generating oxygen through electrolysis and supplying the oxygen into a pipe line 11 through which the drinking water flows, and a dissolving unit 30 dissolving the oxygen in the drinking water.

The oxygen generating unit 20 includes an electrolysis part 25 positioned under a water reservoir 22 supplied with purified water fed from a purifying device 21, the electrolysis part 25 being composed of a porous anode 26, an electrode joint film 27 and a porous cathode 28. A casing 29 has an oxygen outlet port for discharging the oxygen into the water reservoir 22 and a water/oxygen outlet port formed on a lower portion of the electrolysis part 25 for discharging the water and the oxygen.

The dissolving unit 30 includes a pump 31, a Venturi 32, and a dissolving container 50 and a Venturi 33 which are connected in series to each other.

In particular, the dissolving container 50 is provided at an inlet portion thereof with an oxygen pipe 56 for supplying the oxygen generated from the oxygen generating unit into a center portion of the drinking water quickly supplied.

Also, the dissolving container 50 is provided with at an outlet portion thereof with a physical-property changing part 60 made of magnetic substance for changing physical properties of the drinking water and molecular structure to supply micro-bubbles.

In this instance, the physical-property changing part 60 is composed of a tourmaline member 61, a neodium member 62, a cerium member 63, and a samarium member 64, through which the drinking water flows. The tourmaline member, the neodium member, the cerium member, and the samarium member are provided with a plurality of fins 65 protruding from an inner surface thereof, the drinking water being colliding against the fins 65.

The tourmaline member 61 stores the anion absorbed from atmosphere by using a positive electrode of the tourmaline member, and emits weak current of 0.06 mA to a negative electrode, which provides functions of purification, reduction, contamination prevention, mineral effect, alkalization, and fusion of bacteria.

The neodium member 62 changes physical properties of the drinking water using strong magnetic energy to make particle of the drinking water in ultrafine particles and grains of a given size, which provides a function of diluting neutralized impurities in the drinking water so as to prevent scale from being generated in the container or pipes due to the impurities.

The cerium member 63 causes the drinking water to ionize, which provides a function of suppressing bacteria contained in the drinking water.

The samarium member 64 fines the drinking water finely granulized by the neodium member 62 to dilute the impurities to a level of vaporized water (pure water).

The micro-bubbles generated by the physical-property changing part 60 have a diameter of about 0.21 μm to about 10 μm in comparison with bubbles generated by a general aeration device, as can be known from Table 1 below. The bubbles are smoothly floated and swirled by the buoyancy, and thus are uniformly distributed in the drinking water to maximize dissolved oxygen concentration.

TABLE 1

| | Diameter (mm) | Area (mm$^2$) | Volume (mm$^3$) | Contact area per unit size |
|---|---|---|---|---|
| Ceramic fine bubbles | 2-3 | 50-113 | 34-113 | 1.5-1 |
| Medium Bubbles | 3-4 | 113-201 | 113-268 | 1-0.75 |
| Coarse Bubbles | 10 | 1256 | 4187 | 0.3 |
| Micro-bubbles of the present invention | 0.1-10 μm | 0.0314-8.04 | $5.2 \times 10^{-4}$-2.14 | 60.4-3.8 |

Reference numeral 15 denotes a cork, 35 denotes a valve, and 55 denotes a screw for supplying the drinking water fast.

Operation of the present invention will now be described herein.

The drinking water stored in the water reservoir 10 is fed to the dissolving unit 30 through the pipe line 11 by operation of the pump 31 and the Venturi 32.

Also, the oxygen generated from the oxygen generating unit 20 is fed to the dissolving unit 30 to change the drinking water into a functional water having dissolved oxygen concentration of 150 ppm or more.

More specifically, the oxygen generating unit 20 generates the oxygen by electrolyzing the water which is purified by the purifying device 21, by the electrolysis part 25 composed of the porous anode 26, the electrode joint film 27 and the porous cathode 28.

The generated oxygen is fed to the inlet port of the dissolving unit 30 through the oxygen pipe 56.

In this instance, the drinking water is fed to the dissolving container 50 by the pump 31 and the Venturi 32.

When the drinking water and the oxygen passes from the inlet port of the dissolving container 50 to the outlet port thereof through the physical-property changing part 60, the physical properties and molecular structure of the drinking water are changed, thereby generating micro-bubbles and the functional water having dissolved oxygen concentration of 150 ppm or more.

The change of the physical properties of the drinking water is performed by the tourmaline member 61, the neodium member 62, the cerium member 63, and the samarium member 64.

More specifically, the tourmaline member 61 stores the anion absorbed from atmosphere by using the positive electrode of the tourmaline member, and emits weak current of 0.06 mA to the negative electrode, which provides functions of purification, reduction, contamination prevention, mineral effect, alkalization, and fusion of bacteria.

The neodium member 62 changes physical properties of the drinking water using strong magnetic energy to make particle of the drinking water in ultrafine particles and grains of a given size, which provides a function of diluting neutralized impurities in the drinking water so as to prevent scale from being generated in the container or pipes due to the impurities.

The cerium member 63 causes the drinking water to ionize, which provides a function of suppressing bacteria contained in the drinking water.

The samarium member 64 fines the drinking water finely granulized by the neodium member 62 to dilute the impurities to a level of vaporized water (pure water).

The physical properties of the drinking water are changed by the tourmaline member 61, the neodium member 62, the cerium member 63, and the samarium member 64, and simultaneously, the drinking water collides against the fins 65 formed on the inner surface to granulize the bubbles and thus form micro-bubbles.

The generated micro-bubbles have a diameter of about 0.21 μm to about 10 μm, and are smoothly floated and swirled by the buoyancy, thereby being uniformly distributed in the drinking water to achieve the dissolved oxygen concentration of 150 ppm or more.

The dinking water generated by the above apparatus has high dissolved oxygen concentration and physical properties beneficial to the human body.

Since the physical properties and molecular structure of the drinking water are changed to supply the micro-bubbles by the compact construction of the apparatus of the present invention, the whole size of the apparatus can be downsized, thereby increasing the use efficiency thereof.

Although one dissolving container 50 is shown in the drawings, at least two dissolving containers 50 may be applied so as to increase the dissolved oxygen concentration.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As mentioned above, the apparatus generates oxygenated water by dissolving the circulating drinking water and the oxygen fed from the oxygen generating unit and changing the physical properties of the drinking water using the physical-property changing part to generate the micro-bubbles in the drinking water, thereby achieving the dissolved oxygen concentration of 150 ppm or more, which is beneficial to a human body. Also, since the apparatus is downsized, the use efficiency thereof is increased.

The invention claimed is:

1. An apparatus for generating oxygenated water, comprising:
   a reservoir storing drinking water;
   an oxygen generating unit generating oxygen through electrolysis and supplying the oxygen into a pipe line through which the drinking water flows;
   and a dissolving unit dissolving the oxygen in the drinking water and including a pump, a Venturi, and a dissolving container and a Venturi which are connected in series to each other;
   wherein the dissolving container is provided with an oxygen pipe provided at an inlet portion thereof to supply the oxygen generated from the oxygen generating unit to drinking water which flows through the dissolving container; and
   the dissolving container is provided with a physical-property changing part provided at an outlet portion thereof to change physical properties which flows through the dissolving container, wherein the physical-property changing part comprises members composing a magnetic substance and arranged adjacent to one another, the members including a tourmaline member, a neodium member a cerium member, and a samarium member, wherein each of the members further comprises a plurality of fins protruding from an inner surface thereof, and wherein the drinking water flows through the members and collides against the plurality of fins.

2. The apparatus of claim 1, the members being arranged on an inner surface of the dissolving container.

3. The apparatus of claim 1, wherein the tourmaline member stores an anion absorbed from atmosphere by using a positive electrode of the tourmaline member and emits a current of 0.06 mA to a negative electrode.

4. The apparatus of claim 1, wherein the neodium member renders particles of the drinking water into ultrafine particles.

5. The apparatus of claim 1, wherein the cerium member causes the drinking water to ionize.

6. The apparatus of claim 1, wherein the samarium member purifies the drinking water.

* * * * *